July 14, 1964 J. S. COURTNEY-PRATT 3,141,105
CATHODE RAY TUBE WITH COMPOSITE MULTIPLE GLASS FIBRE FACE
Original Filed Aug. 26, 1957 3 Sheets-Sheet 1

Inventor:
Geofry Stuart Courtney-Pratt
By:
Stevens, Davis, Miller & Mosher
Attorneys July 14, 1964     J. S. COURTNEY-PRATT     3,141,105
CATHODE RAY TUBE WITH COMPOSITE MULTIPLE GLASS FIBRE FACE
Original Filed Aug. 26, 1957     3 Sheets-Sheet 2

Inventor:
Geofry Stuart Courtney-Pratt
By
Stevens, Davis, Miller + Mosher
Attorneys United States Patent Office 3,141,105
Patented July 14, 1964

3,141,105
CATHODE RAY TUBE WITH COMPOSITE MULTIPLE GLASS FIBRE FACE
Jeofry Stuart Courtney-Pratt, Springfield, N.J., assignor, by mesne assignments, to American Optical Company, Southbridge, Mass.
Continuation of application Ser. No. 680,308, Aug. 26, 1957. This application Dec. 19, 1963, Ser. No. 332,984
27 Claims. (Cl. 313—68)

This invention relates to electronic tubes of the type in which an image capable of being photographed is projected upon a wall of the tube. This is a continuation of application Serial No. 680,308, filed August 26, 1957, and entitled "Cathode Ray Tube With Composite Multiple Glass Fibre Face."

According to the invention there is provided an electronic image-forming tube in which at least part of the envelope of the tube consists of a bundle of light guiding fibres bonded together into a gas-tight slab with the axes of the fibres running transversely from one surface of the slab within the tube to another surface of the slab outside the tube, the slab being bonded to the remainder of the envelope in gas-tight fashion so as to form a structural wall of the tube.

According to the invention there is further provided an electronic tube comprising a source of electrons, means for accelerating the electrons so that they bombard a wall of the tube, means for controlling the electrons so that they provide an image-forming beam, the wall of the tube bombarded by the electrons being in the form of a bundle of light guiding rods bonded together into a gas-tight slab with the fibres oriented in a regular array and with their longitudinal axes extending from the interior surface of the tube to the exterior surface of the tube, the surface of the slab within the tube being coated with a substance of a type which, when bombarded with electrons emits radiation to which a photographic plate is sensitive.

According to the invention, there is yet further provided an electronic tube assembly comprising a first photosensitive cathode layer deposited upon a first wall of a first evacuated envelope, a first phosphor layer deposited upon a second wall of the first evacuated envelope, such wall being in the form of a bundle of light guiding fibres bonded together into a gas-tight slab, with the fibres oriented in a regular array with their longitudinal axes extending from one major surface of the slab to the other, means for accelerating the electrons emitted by the first cathode layer so that they bombard the first phosphor layer, means for focusing the said electrons into an image-forming beam, a second photosensitive cathode layer deposited upon a third wall of a second evacuated envelope, the third wall being in the form of a bundle of light guiding fibres bonded together into a gas-tight slab, with the fibres oriented in a regular array with their longitudinal axes extending from one major surface of the slab to the other, the second and third walls being juxtaposed so that light given off by the first phosphor layer passes along the light guiding fibres of the second and third walls in succession and activates the second photosensitive cathode layer, a second phosphor layer deposited upon a fourth wall of the second envelope, the fourth wall being in the form of a bundle of light guiding fibres bonded together into a gas-tight slab, with the fibres oriented in a regular array with their longitudinal axes extending from one major surface of the slab to the other, means for accelerating electrons emitted by the second photosensitive cathode layer so that they bombard the second phosphor layer, and means for focusing the said electrons into an image-forming beam.

The invention will be more readily understood from the following detailed description illustrated by the accompanying drawings in which.

For explaining the nature of the invention, it is convenient to consider a cathode ray tube with a fluorescent screen such as is used in cathode ray oscillographs or television receivers, though, as will be explained below, the invention is not confined to such tubes.

In a cathode ray tube, a beam of electrons strikes a fluorescent or phosphorescent screen which normally takes the form of a coating applied to the inner surface of a glass wall of the tube and beam deflecting means and beam intensity controlling means are provided so that an image is produced on the screen in response to signals applied to these means. Considering a single illuminated picture element of the image, some of the light is scattered, some is absorbed, and some passes through the glass wall and is emitted outwardly from the wall of the tube in divergent directions. The distribution of the latter is such that the intensity is greatest in directions normal to the tube wall and diminishes as the angle to this normal increases and it is generally considered to follow a Lambert distribution though there are indications that the reduction of intensity with increasing angles to the normal is somewhat more rapid. Nevertheless an observer in the most favorable position sees only a small fraction of the light emerging from the tube wall and in a typical case a lens placed at a suitable position for photographing the image received only one percent of the total light emerging from the tube wall. It is possible by the use of special lenses to improve on this performance somewhat but even so the major part of the light emitted from the tube is lost.

Figure 1:
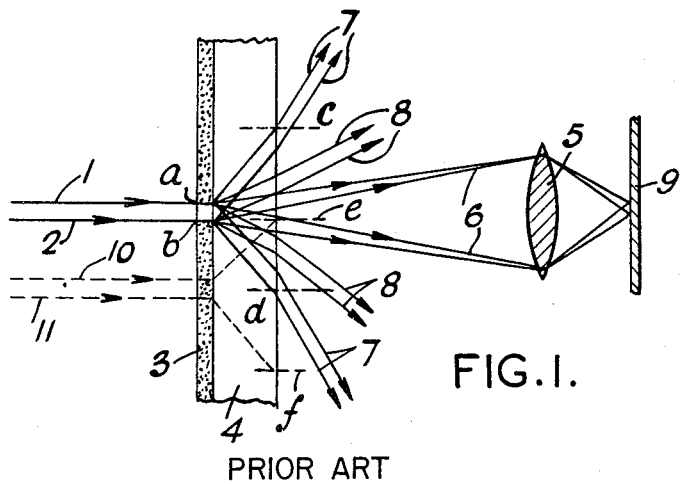
FIG. 1 is a diagram illustrating certain disadvantages encountered in taking photographs of the display of an electron tube of conventional type.

This is illustrated in FIG. 1 which shows a cross section of the end wall of a tube of the type in question. The lines 1, 2, bearing arrows, to the left of the figure, represent a focused electron beam impinging upon an area $a$–$b$ of the fluorescent coating 3 on the glass-end wall 4 of the tube to form the normal scanning spot. When viewed by the human eye or an equivalent man-made lens system, such as the camera lens 5 indicated diagrammatically at the right hand side of the figure, only a small part of the emergent light, namely that which is represented by the arrow-marked lines 6 joining $a$–$b$ to the lens 5, strikes the photographic plate indicated diagrammatically at 9. The divergent arrows 7 and 8 indicate the light missed by the lens 9 and wasted. This is not greatly affected by the thickness of the glass wall of the tube. The light is transmitted in all directions from the spot on the fluorescent coating and any rays not suffering total internal reflection in the glass receive the same additional dispersal due to refraction at the glass-air interface, whether the glass is thick or thin.

It has been proposed to overcome this difficulty by placing a sensitized plate within the evacuated area of the tube so that the electrons produce a latent image directly in the emulsion, but this involves the complication of a continuously evacuated tube with a detachable wall and other well known disadvantages of such tubes.

Another proposed solution of the problem is to make a wall of the tube of metal so thin that the electrons of the cathode beam can pass through it and expose a sensitized plate placed against the wall outside the tube. The structure weakness of such a thin wall is such that it will not support the vacuum within the tube unless there is a vacuum on the outside of the wall as well as the inside; and the provision of this external vacuum involves a continuously evacuated ante chamber which is little less troublesome than a continuously evacuated tube with the sensitized plate placed inside it.

Yet another proposed solution is to provide a tube with a substantially flat image-bearing wall and to place a sensitized plate directly in contact with it. The disadvantage of this proposal is that, although most of the emergent light is captured, the thickness necessary to enable a flat wall to withstand the vacuum within the tube is such that the light spreads out, within the glass, in a cone of substantial included angle so that a light spot on the phosphor within the tube is spread out over a considerably increased area by the time it reaches the sensitized plate and resolution is much impaired. In a typical case, a resolution of the order of 2 to 3 lines per centimetre was the best that could be obtained. It is no solution of this difficulty to increase the screen size and attempt to restore the definition by photographic reduction of the exposed plate since structural strength requires a still thicker wall which cancels out the advantage of increased image size. These difficulties can be illustrated by the aid of FIGURE 1, wherein it is seen that the light spot a–b has become expanded to an area indicated by the lines c–d causing overlapping with a light spot in a position removed from the first by several times the diameter of the spot. The dotted lines 10 and 11 show such an adjacent beam and spot position which is dispersed to the area indicated at e–f, the top edge of which comes approximately in the middle of the area c–d. The sharp white-black-white transitions between the a–b position and the dotted line 10, 11 position on the fluorescent screen are completely obscured by the patch of light between c and f.

These difficulties are overcome, according to the invention by the use as part of the external envelope of the tube, of a bundle of light-guiding fibres bonded together into a gas-tight slab with the fibres running transversely from one surface of the slab to the other.

The image-forming rays are directed to the interior surface of the slab which in the case of a cathode ray tube will be coated with a layer of fluorescent or phosphorescent material.

The principle of light guides is so well known as to need only brief description. A transparent elongated smooth-surfaced body of higher refractive index than its surroundings will transmit light applied to one end so that it emerges with little loss from the other end, due to internal reflection from its surfaces, of light trays divergent from the longitudinal axis of the body. Where a bundle of light guides is used, an image cast on one end face is reproduced with little loss of light intensity upon the opposite end face even when the individual light guides are of substantial length. The output end of each individual light guide is evenly illuminated to a degree depending on the average intensity of the light falling on its other end upon which the image is cast so that the resolution of the image after transmission along the bundle depends upon the number and cross-sectional dimensions of the individual guides. For most practical purposes, the individual light guides should take the form of fibres which where extremely high resolution is required, may be very fine, for instance of the order of 0.001 inch in diameter or even finer, though requirements for fibres finer than about 0.004 inch in diameter will seldom arise in practice.

It is necessary that the same relative positions shall be maintained by the fibres at both ends of the bundle as any substantial transposition of the fibres would result in a scrambled image appearing at the viewing end. An occasional rod out of place here and there is of little consequence however.

The fibres should be bonded together with a substance capable of filling the interstices between the fibers and uniting with the surfaces of the fibres to provide a gas-tight slab; and this bonding material should have a relatively low refractive index in relation to that of the material of which the fibres are made as this is a condition necessary for the internal reflection upon which light guides depend for their action. The bonding material should also be of such a nature that it does not give rise to gassing troubles when exposed to the conditions within the evacuated tube. It is not essential for the bonding material meeting those requirements to extend through the full thickness of the slab so long as it extends to a sufficient depth from the interior surface of the slab to ensure gas-tightness and freedom from out-gassing since the remaining thickness of the slab may be bonded with a material not having those properties so long as it provides the required structural strength and has a refractive index lower than that of the fibres. It is furthermore not essential that the light guiding fibres should be bonded together over their full length as long as the bonded region is sufficient to produce the required strength and gas-tightness. If material to meet the above requirements is not available, the bundle should be protected from the conditions within the tube by a thin layer of transparent material applied to the interior surface of the bundle. This will cause some scattering of the light within the thickness of the coating but the loss of definition will not be serious if the coating is thin. If difficulty is experienced in obtaining a bonding material having a suitable refractive index and at the same time possessing the other qualities required of it, the difficulty may be overcome by coating fibres with a thin layer of a reflecting metal, such as silver or aluminum, before assembling the bundle, or alternatively with a thin layer of material of low refractive index. The latter is in fact superior to the former as metals, even with a polished surface, absorb a substantial amount of incident light. The bundle is sealed into and forms part of the wall of the tube and it may be of any convenient thickness which may be required to withstand the vacuum. Both surfaces will generally be ground flat and parallel to one another, but this is not fundamental to the invention in all its applications. For instance, it may be convenient for certain applications to have the outside surface of the bundle in the form of part of the surface of a cylinder. The important thing is that the wall can be made in shapes which would not, in the absence of the invention, be strong enough to withstand the vacuum unless they were of such a thickness as to impair definition to an unacceptable extent. A wall according to the invention can be of any convenient thickness without affecting image definition to any appreciable extent.

Where it is intended to photograph the image, the outer surface of the bundle is generally made flat and a sensitized plate is placed in contact with it. By this means, the light which would be lost by using a lens system is saved and there is not the degradation of definition due to diffusion in the thick wall which is necessary to withstand the vacuum when the wall is of homogeneous material and flat so that the sensitized plate can be placed in contact with it to avoid the need for an image-forming lens system.

Figure 2:
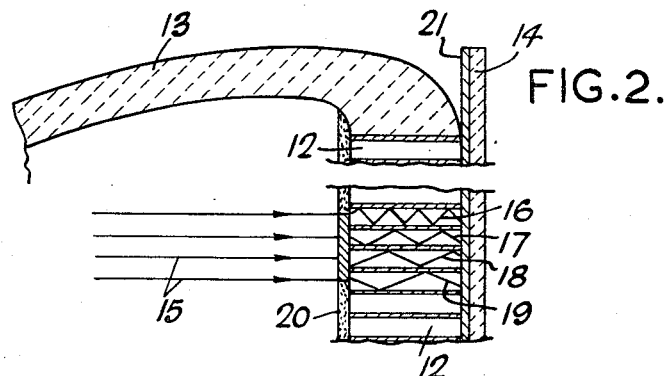
FIG. 2 is a section of part of a tube according to the invention.

FIGURE 2 shows a cross section of part of the fibre bundle 12 and part of another wall 13 of a cathode ray tube according to the invention, used for photographing the tube display on a flat photographic plate 14. The electron beam 15 shown on the left, lights up a spot on the phosphor screen 20 which bridges at least part of four fibers 16, 17, 18 and 19, as seen in section, and each fibre is shown with internal reflections proceeding along it, at different angles in the four fibres though in fact, of course, each fibre has reflections at all angles above the critical angle. The diameters of the fibres have been greatly exaggerated so that the paths of internally reflected light rays can be shown. The light path which exposes the sensitized plate may be blurred slightly at the edges by reason of the edge of the light spot on the phosphor screen over-lapping only part of a fibre. This will produce reduced illumination evenly distributed over the whole of the other end of the fibre, but as in practice, the spot on the phosphor screen seldom has a sharp margin, the loss of definition is small so long as the cross-sectional areas of the individual fibres are small compared with the image. The plate 14 is preferably placed with the emulsion 21 towards the tube. In FIG. 2, the thickness of the emulsion 21 has been exaggerated.

The invention may with special advantage be applied to image converter tubes of the type having a photo-sensitive cathode, an electronic focussing system, and a fluorescent screen, accelerating potentials being provided for producing on the screen an image corresponding to the image cast upon the photo-sensitive cathode, the intensity of the image being increased by a factor which may be between 10 and 100. The amount of light leaving the screen which can be collected by a lens is however rarely more than about 1 percent of the total light emitted by the screen so that there is an overall loss of intensity or at any event no gain. Similarly, litle or nothing is gained by arranging several such tubes in cascade where a lens system is interposed between the screen of one tube and the cathode of the next. By means of the invention however, the screen of such a tube can be made flat and for photographing the image thereon, a photographic plate may be placed against its outside surface thus avoiding the loss of intensity associated with the use of a lens system without the sacrific of resolution due to diffusion in a homogeneous tube wall of comparable thickness.

A further important advantage of the invention as applied to image converter tubes is that it enables two or more of them to be used in cascade with advantage. This may be done by making the screen wall of one tube and the cathode wall of the next tube in the cascade, of bundles or fibres the interior face of the former carrying a fluorescent layer and interior face of the latter a coating of photosensitive electron emitting material. The outer surfaces of both these bundles of fibres are flat and are placed in contact with one another and it is not essential to register them fibre to fibre as the staggering of the fibres of the two screens causes only a slight loss of resolution if the fibres are thin. By this means the full gain of one tube is effectively passed on to the next tube in the cascade, only a very small loss being incurred due to absorption in the material of the fibres and due to the escape of rays striking the walls of the individual light guiding fibres at angles of incidence less than the critical angle for the particular combination of materials used for the fibres and the bonding material respectively.

If the amplified image is to be photographed, the screen of the last tube should be on a wall consisting of a bundle of fibres to enable direct photographing to be achieved without the loss of light involved in the use of a lens system. It will be clear that this latter loss is suffered if the final display is viewed by the eye, since the eye is a lens system and catches only a small part of the emergent light. The maximum efficiency can therefore only be obtained by photographing the final display by placing the photographic emulsion directly up against the fibre bundle end wall of the final tube.

Figure 3:
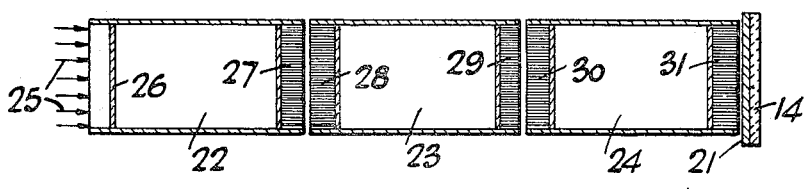
FIG. 3 shows, diagrammatically, an electron tube assembly incorporating the invention.

FIG. 3 shows an arrangement of cascaded image convertor tubes schematically. Three tubes 22, 23 and 24 are shown, the incident image rays 25 being applied to the left hand wall of tube 22 which carries a photo-sensitive cathode coating 26. This wall need not necessarily be made of a bundle of light guiding fibres but it is necessary that the screen wall 27 of tube 22, the cathode and screen walls 28 and 29 of tube 23, and the cathode and screen walls 30 and 31 of tube 24, should be so constructed to obtain the full benefit of the invention.

It may be seen from FIG. 3 that this multi-tube cascade can be constructed as a single tube with two intermediate partitions made of bundles of light guiding fibres coated on one side with fluorescent material and on the other side with photosensitive electron-emitting material.

These partitions can, substantially without loss of light intensity and resolution, be made of any thickness necessary to withstand the full inter-electrode potential which may appear across the screen of one tube and the cathode of the next if a common supply source provides this potential for all three stages.

Any other form of partition wall in such a tube would have to be made of physically thin material to preserve definition and this adds to the difficulty of manufacture.

Any convenient number of cascade stages can be made as a unit structure in this way.

Such a cascade arrangement may precede a television camera tube to enable it to operate in conditions of low illumination, for instance by star light.

Where several tubes are cascaded in the manner above described, the cumulative loss of definintion due to staggering of the light guides as between the phosphor coated wall of one tube and the cathode coated wall of the next may be unacceptable. This loss may be minimized if, in manufacture, the bundles of light guides are made with the spacing and arrangement of the fibres accurate and uniform as between one bundle and another, preferably with index marks to secure uniform orientation. Adjacent bundles in an assembly of cascaded tubes can be turned till the index marks coincide, and then aligned in two dimensions by micrometer adjusting screws until optimum definition is obtained. Some of the methods hereinafter described of making bundles of light guiding fibres, permit the making of bundles of substantial thickness lengthwise of the fibres. A thick bundle can be sliced into a number of almost identical slabs from which can be made a batch of matched tubes for use in a cascade arrangement. The matched tubes could then readily have their adjacent walls adjusted for alignment of the fibres even though the arrangement and spacing over the slabs was irregular.

The invention finds uses in other electron-optical apparatus, such as electron diffraction cameras, electron microscopes and the like. A continuously evacuated demountable tube is still necessary, but if the end wall of the tube is made according to the invention, a photographic plate can be placed against it outside the evacuated space and can be changed or traversed over the outside surface of the wall to take a succession of photographs of a speciment within the tube which may be undergoing changes during the period of observation. To achieve this object without the use of the invention necessitates elaborate remotely controlled plate or film changing devices operating within the evacuated zone.

Instead of parallel light guiding fibres, tapered fibres may be used. These tapered fibres may be made in a tapered or a parallel format.

In the case of the tapered format, the slab of light guides is of larger area at the large ends of the fibres as compared with the small ends, the relative spacing of the fibre-ends being substantially the same at both faces of the slab.

A slab of this type incorporated in a tube with the large ends of the fibres inside the tube, can be used for photographing, at reduced size, a display on a phosphor on the surface of the slab inside the tube. For substantial reductions of image size, the brightness in terms of quantity of light per unit area will be substantially the same at both faces of the slab and there is little or no gain of specific brightness due to the reduction in size of the image. The reason for this is explained below. Nevertheless there is a substantial gain in the light available for exposing a photographic plate as compared with a conventional lens reduction system, by virtue of the plate being in direct contact with the small end of the tapered slab, since the lens system working with any substantial reduction of image size, only catches a fraction of one percent of the light provided by the display on the phosphor.

Where a tapered slab is used with the small ends of the fibres inside the tube, the total quantity of light per rod is substantially the same at both ends of the guide so that bright large-screen display is obtained at the large end of the slab with only moderate brilliance at the phosphor as compared with that required with conventional large screen systems using an optical enlarging system such as a folded Schmidt lens system where all but a small percentage of the light given out by the phosphor is wasted. This arrangement is of great value for providing large television or radar displays.

A tapered light guide in a parallel format provides at the thin ends of the fibre rods, an image built up of widely spaced dots resembling a half-tone picture. This may be used for high speed cinematography of a quickly changing display on the phosphor of the tube. The procedure is to displace the photographic plate by a small amount for each exposure so that the dots fall in different but interlaced positions. As the plate can be displaced in two directions at right angles the number of separate exposures is proportional to the square of the inter-dot spacing. A similar effect can be achieved by using parallel guides and a suitable mask exposing only part of the outer end face of each guide fibre.

The final result is a series of interlaced half tone images which can be "unscrambled" in a number of ways well known in the high-speed cinematography art. Unscrambling can proceed at leisure so that simple apparatus may be used. A screen with holes in the same formation as the small ends of the fibres in the slab may be readily produced by photographing the slab with even illumination of the phosphor. Such a screen can be placed over the scrambled negative and successive prints taken with the screen exposing different sets of dots for each print.

With tapered light guides, there is a difference in performance as between convergent and divergent guides, in the direction of light transmission. This may be explained as follows. Take the case of a parallel guide fibre: with the optimum ratio of refractive indices as between the fibre and its surroundings it can be relied upon that a light ray incident upon the input end of the fibre, at almost grazing incidence, will be refracted on entering the guide to an angle more nearly approaching parallelity with the axis of the guide and that such a ray will have an angle of incidence greater than the critical angle, to the surfaces of the guide, this angle remaining constant despite multiple reflections in passage of the ray along the guide. In the case of a convergent tapered guide, however, the angle of incidence of rays in passage along the guide is progressively diminishing and certain rays which would have passed along a parallel guide are lost in the case of a convergent tapered guide when the changing angle of incidence becomes less than the critical angle. This loss becomes progressively more severe, the greater the reduction in area as between one end of the guide and the other.

Where a 10:1 reduction of linear dimensions is used (100:1 in area), for instance, there is a loss of all but about 1 percent of the ingoing light which accounts for the brightness per unit area being substantially the same at both ends of a convergent light guide slab in a tapered format, as stated above. Where a tapered format is not required, a similar effect to a parallel format of tapered light guides can be obtained by using parallel guides and masking all but, for example, $\frac{1}{100}$ of the area of the output ends of the individual guides, the loss of light being about the same at substantial size reduction ratios as that suffered by tapered light guides in a parallel format.

With divergent tapered light guides however, the angles of incidence of rays increase on successive reflections on passage down the guide and rays which would just escape reflection in a parallel guide will be reflected and retained in a divergent guide. This explains why there is no loss of specific brilliance in the case of divergent light guides.

Various methods of making a bundle of light guiding fibres will now be described.

Figure 4:
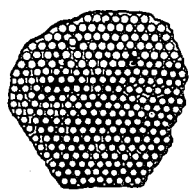
FIG. 4 is a partial end view of a bundle of light guiding fibres for use in the invention.

For extremely high definition where the fibres must be of small diameter, for instance a few thousandths of an inch or less, it is preferred to use, as the fibres, short lengths of glass filament drawn down to the required size and bonded together, for at least part of the thickness of the slab, with a glass of lower melting point and a lower refractive index than that of the fibres. Glasses of the type commonly called "glass solders" are suitable for the purpose. FIGURE 4 shows a portion of a major surface of such a slab, on an enlarged scale.

To secure the maximum possible transmission of light along the fibres, the refractive indices of the fibres and the surrounding material in contact with their surfaces of the slab must have the relationship $n_1^2 > 1 + n_2^2$ where $n_1$ is the refractive index of the fibres and $n_2$ is the refractive index of the surrounding material.

Table I below shows some typical examples:

| Refractive index of material surrounding the fibres ($n_2$) | Refractive index of fibres ($n_1$)(equal to or greater than) |
|---|---|
| 1.4 | 1.72 |
| 1.48 | 1.79 |
| 1.5 | 1.803 |
| 1.6 | 1.89 |
| 1.7 | 1.97 |
| 1.8 | 2.06 |

Table II below shows the consequences of departing from the required relationship in a case where $n_2$ is fixed at 1.5 and $n_1$ is varied:

| $n_1$ | 1.803 | 1.8 | 1.75 | 1.7 | 1.6 | 1.5 |
|---|---|---|---|---|---|---|
| Approx. percentage total internal reflection with $n_2$ 1.5. | 100% | 90% | 59% | 41% | 17% | Zero internal reflection, only direct rays pass |

In the above tables emphasis is placed on $n_2$ because it is difficult to obtain vitreous materials with a refractive index below about 1.4, and this determines the range of glasses from which the glass for the fibres may be chosen.

Figure 5:
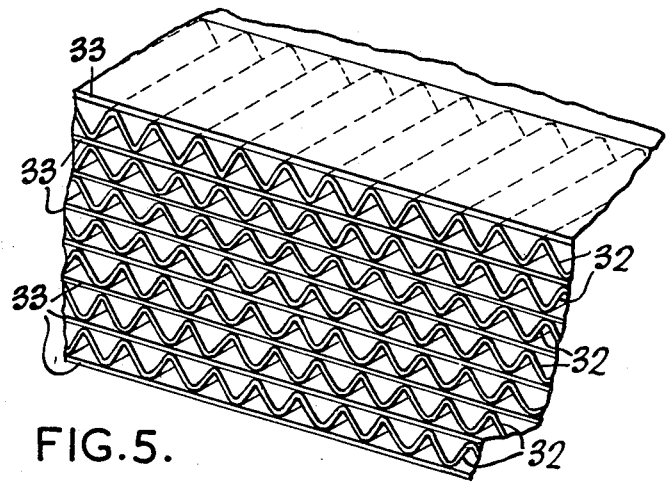
FIG. 5 illustrates by means of a perspective drawing a method of making another type of light guide bundle for use in the invention.
Figure 6:
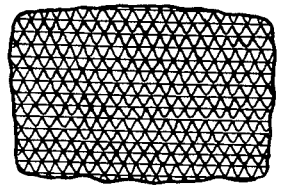
FIG. 6 is a partial end view of a bundle of light guides made by the method illustrated in FIG. 5.

An alternative to high melting point fibres embedded in low melting point glass "solder" is illustrated in FIGURES 5 and 6.

A glass of relatively high melting point and low refractive index is chosen for the material surrounding the fibres. Strips of this glass in thin sheet form, preferably of the order of 0.001 inch thick, are corrugated with the corrugations running transversely of the length of the strip. The corrugations may be imparted to the strips by passing them when hot between cogged rollers or pressing them between matching ribbed plates. The profile of the corrugations is not critical provided that the bends are not so abrupt as to weaken the strips. An approximately sinusoidal profile is suitable. These corrugated strips, shown greatly enlarged at 32 in FIGURE 5, are interleaved with uncorrugated strips of the same material, shown at 33 in FIGURE 5, and a honeycomb structure is built up of the size required for the slab. The spaces between the corrugations and the flat interleaving strips are now filled in with a glass of low melting point and high refractive index which will "wet" the glass of the honeycomb, and this glass forms fibres. The advantage of this arrangement over that previously described is that glasses of high refractive index and low melting point are in general easier to handle than glasses of high refractive index and high melting point.

Figure 8:
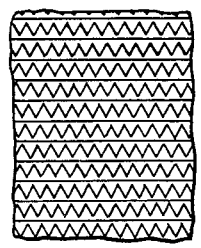
FIG. 8 is a partial end view of a bundle of light guides made by the method illustrated in FIG. 7.
Figure 7:
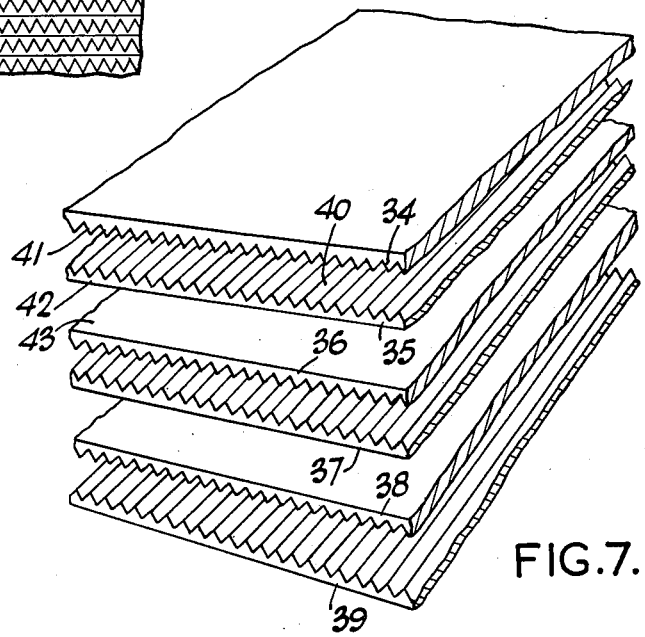
FIG. 7 illustrates by means of a perspective drawing another method of making a bundle of light guides which is a modification of those shown in FIGS. 6 and 7.

FIGURE 6 shows an end view of a section of a slab made by the method illustrated in FIGURE 5 to a somewhat enlarged scale. It is important that the height of the corrugations should be accurately uniform to avoid gaps between their crests and the interleaving plates, which would provide interconnecting webs between adjacent fibres. Some slight leakage between adjacent fibres is inevitable if the filling-in glass is to seal the slab completely, but the leakage of light between adjacent fibres will not exceed a few percent so long as the thickness of any such web interconnecting the fibres is less than about one fortieth of the thickness of the fibres.

Where the highest definition is not required, the light guides may be made in the form of ridges raised from the surface of a sheet of suitable material. Ridged sheets of this type are shown in FIGURE 7 where six sheets 34, 35, 36, 37, 38 and 39 are shown as part of an assembly, in exploded form, which is destined to form part of a bundle of light guiding fibres. The ridged faces such as 40, 41 of the sheets are so shaped that they interlock when brought together and adjacent flat faces such as 42, 43 also come together. These ridged and adjacent faces are bonded together with a material having a lower refractive index than that of the sheets so as to form a solid block an end view of a part of which is shown in FIGURE 8. Sheets such as 34–39 may be made in glass by a moulding or casting process and assembled in clamps and thin spacers may be placed between adjacent sheets along two opposite edges of the sheets to leave spaces between adjacent faces into which the bonding material can be run. Where these spacers run across the surface of the slab the part of the slab which they occupy is preferably ground away when bonding has been completed.

It has previously been indicated that a bundle of tapered light guides can be used with advantage for image reduction or enlargement when the guides are made up in a tapered format.

Figure 9:
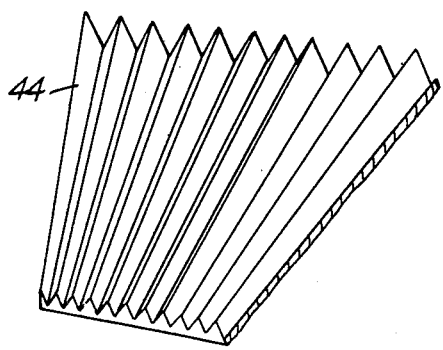
FIG. 9 illustrates by means of a perspective drawing a method, similar to that illustrated by FIG. 7, of making a bundle of tapered light guides.
Figure 10:
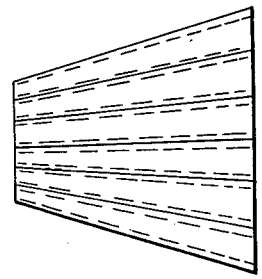
FIG. 10 is a side elevation of a bundle of light guides made by the method illustrated in FIG. 9.

FIGURE 9 shows a ribbed sheet 44 made by a process similar to that used for the sheets of FIGURE 7 but in this case the ribs are tapered in width, spacing and height from one end to the other. An assembly of such sheets, the actual thickness of the individual sheets being somewhat enlarged to simplify the drawing, is shown in side elevation in FIGURE 10.

Where single fine fibres are used as the light guides, there may be difficulty in assembling them into a block so that they take up a regular formation. One way of ensuring a regular formation is to weave the fibres into a fabric with transverse connective strands considerably finer than the fibres themselves. Several strips of such fabric are then stacked on top of one another to form the slab, and if the edges are trimmed so that the angle of the fibres to the edge (preferably 90°) is uniform, the parallel alignment of the fibres in adjacent layers of the stack is readily ensured by dressing the edges of the sheets against a plane surface.

In making such a fabric, a simple loom may be used and the connecting strands are preferably used as the warp since they need not be closely spaced and thus closely pitched and slender reeds are not required for the heddles. With the fibres used as the weft, little difficulty is experienced in ensuring that all the bending is confined to the connecting strands, since they are positively bent around the thicker fibres of the weft when the heddles are moved to change the shed. It is preferable to introduce the fibres into the shed of the warp by means of a "rapier" rather than a shuttle as sharp bending and the formation of a selvage at the edges is undesirable. Such a rapier is thrust through the shed and grasps the end of a reel of fiber material by means of a clamp on its end. The rapier is then withdrawn and the end of the fibre material is drawn through the shed, being severed from the reel by a chopping mechanism located on the other side of the warp, that is to say the reel side, in such a way that a free end projects from the reel to be grasped by the rapier on its next excursion through the shed. Mechanisms of this type are well known in the textile industry.

Figure 11:
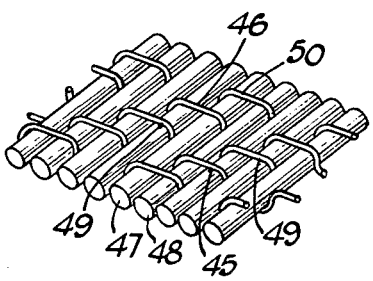
FIG. 11 illustrates by means of a perspective sketch a further method of making a bundle of light guides for use in the invention, and, FIG. 12 is an end elevation of part of a bundle of light guides made by the method illustrated in FIG. 11.

The preferred weave is a twill weave in which each warp strand passes alternately over two and under two weft strands, the crossing point advancing by one weft strand as between one warp strand and the adjacent one in a particular direction across the warp. The fabric thus woven is superior to a plain weave as the latter will stretch warp-wise when all the bending is done by the warp. With the twill weave however, as shown in FIGURE 11, for every pair of warp strands such as 45, 46 which cross over between two adjacent weft strands such as 47, 48, there is an adjacent pair of warp strands such as 49, 50 binding those two weft strands together.

Figure 12:
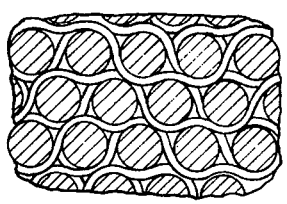

A part of a stack of fabric sheets is shown in end view, greatly enlarged, in FIGURE 12 and it can be seen that if the stack is compressed vertically the weft fibres of one layer will sink into the spaces between adjacent fibres in the adjoining layer depressing strands of the warp which bridge pairs of adjacent fibres so as to draw the fabric tightly together warpwise. The warp ends of the sheets must of course be appropriately sealed to prevent fraying.

Another method of providing a web fibres of regular formation is to wind a continuous length of fibre material on to a cylinder of large diameter with regular closely spaced turns in a single layer. The completed layer is then impregnated with the chosen bonding material to form webs joining adjacent turns together and the coil is then cut into slices, the cuts running parallel to the axis of the cylinder. The slices when stacked and clamped together with the cut edges parallel will then nest accurately together with the fibres in regular formation. Further impregnation with the chosen bonding material turns the stack into a solid slab.

In a modification of this method, a multilayer winding with the turns of adjacent layers accurately and regularly aligned (which necessitates the winding of all the layers in the same axial direction), is built up to a substantial radial thickness. The coil is then impregnated as a whole whilst still supported by the winding drum. Individual slabs can then be cut from the coil by pairs of cuts in planes parallel to one another, parallel to a radius between the planes and parallel to the axis of the drum.

In cases where difficulty is experienced in using materials for the slab which will withstand the temperatures necessary for out-gassing the tube or where for any reason, such as expense, it is deliberately decided to use materials which would give off gases which would contaminate the electrodes of the tube, the slab may be isolated from the interior of the tube by a thin layer of glass bonded to the surface of the slab. The price of using this layer of glass is some loss of definition since there is some divergence of the light rays in passage through the thickness of the glass. This loss of definition will be small however so long as the glass is thin in relation to the diameter of the fibres and the glass will inevitably be fragile. In making a tube of this type it will therefore be necessary to evacuate the tube and heat it for out-gassing, with the thin glass sheet united to the walls of the tube as a flat membrane. To avoid rupture of the membrane on evacuation of the envelope, the exterior of the tube, at least at the membrane end, must also be enclosed in an evacuated space to equalise the pressure on both sides of the membrane. After heat treatment is completed, the slab, coated with a suitable cement, is then introduced through a vacuum lock into the enclosure outside the tube and brought into contact with the outer surface of the membrane which may be slightly bowed outwards by means of a slightly lower pressure in the enclosure outside the tube than that within the envelope, so that contact is secured between the membrane and the slab over the whole of their adjacent surfaces when the slab is pressed against the membrane by a remotely controlled handling mechanism within the evacuated enclosure surrounding the tube. When the cement has set and united the slab to the membrane, the vacuum can be released from the said enclosure and the membrane will be supported against collapse by the adherent slab.

When this form of construction is used, the choice of materials for the slab is greatly widened and both fibres and bonding material may be of materials other than glass. As an instance, fibres of an acrylic resin, may be bonded together with an epoxy resin adhesive. The ribbed sheet type of fibre assembly illustrated in FIGURES 7, 8, 9 and 10 is well adapted for use with such materials as the ribbed sheets can be produced by well known moulding techniques whereas the moulding of such sheets in glass necessitates the use of special metals for the moulds to ensure ready parting of the moulding from the dies.

With this method of tube assembly, the membrane completes and ensures the gas-tight sealing of the slab so that, in choosing the bonding material for filling the interstices between the fibres, preference can be given to a material with a suitable refractive index even though its sealing properties would be inadequate in the absence of the membrane. With this method of tube assembly, it is also possible to clamp the light guiding fibres or sheets of fibres together, relying solely on the membrane to provide the gas-tight sealing, the friction of the clamping and the adhesion of the guides to the membrane providing the strength required of the slab. References in this specification to a gas-tight slab shall be deemed to include a slab where gas-tightness is secured completed or ensured by the use of a membrane as above described and in such a slab the membrane is to be regarded as part of the slab. Furthermore, in the case of slabs of this type, references to the light guiding fibres as extending from one surface of the slab to the other are to be regarded as referring to the orientation of the axes of the fibres and not as implying that the rods penetrate the membrane.

Mention has been made previously of coating the light guiding fibres with a material of low refractive index to enable the bonding material to be chosen without regard to its refractive index. When the materials of which the slab is made are not required to be capable of withstanding the temperatures used in heat treating the tube, plastic substances may be used for coating the fibres. Polychlortrifluorethylene, having a refractive index in the region of 1.43 and which may be caused to adhere, for instance, to glass, is a suitable substance for the purpose. This material may be applied in liquid form by spraying or dipping and cured at a temperature of about 280° C. to produce a continuous adherent film.

To provide a slab resistant to higher temperatures than this, a vitreous substance must be used for coating the fibres. In one process, a layer of vitreous quartz of refractive index about 1.48 is applied in the form of a silicone or chlorsilane to the fibres whose temperature is held at about 400° C.

To be effective in securing total internal reflection within fibres coated in this way, the thickness of the coating should preferably be several half-wave-lengths of the light requiring to be transmitted, though a thickness of only one half-wave-length will suffice in certain applications.

In the case of tapered guides used in a parallel format, i.e., with their axes parallel, arrangements must be made to space the narrow ends apart in the correct formation, during impregnation with the bonding material. One method of achieving this, where individual tapered fibres are used, is to weave them together in the manner illustrated in FIGURES 11 and 12 but with the warp woven only along the thin ends of the fibres so that the thick ends are able to make contact with one another.

On assembly of a stack of sheets woven in this way, the sheets must be spaced apart at the thin ends of the fibres by spacers of material of low refractive index, if the spacers make contact with the rods. It may however be arranged that the warp strands separate the fibres from contact with the spacers in which case the refractive index of the latter is unimportant.

References in this specification to "light guiding fibres" shall be deemed to include fibres which perform the analogous function when subjected to electromagnetic vibrations having properties equivalent to those of visible light notwithstanding the fact that such vibrations are outside the range of vibrations to which the human eye is sensitive.

What I claim is:

1. An electronic tube assembly comprising a first photo-sensitive cathode layer deposited upon a first wall of a first evacuated envelope, a first phosphor layer deposited upon a second wall of the first evacuated envelope, the major area of said second wall being in the form of a bundle of very fine light guiding fibres having smooth side surfaces and of a predetermined index of refraction bonded together into a gas-tight slab by a material having a lower index of refraction and with the fibers oriented in a regular array with their longitudinal axes extending from one major surface of the slab to the other, means for accelerating the electrons emitted by the first cathode layer so that they bombard the first phosphor layer, means for focussing the said electrons into an image-forming beam, a second photo-sensitive cathode layer deposited upon a third wall of a second evacuated envelope, the third wall being in the form of a bundle of light guiding fibres of the above character bonded together into a gas-tight slab with the fibres oriented in a regular array with their longitudinal axes extending from one major surface of the slab to the other, the second and third walls being juxtaposed so that light given off by the first phosphor layer passes along the light guiding fibres, of the second and third walls in succession and activates the second photo-sensitive cathode layer, a second phosphor layer deposited upon a fourth wall of the second envelope, the fourth wall being in the form of a bundle of light guiding fibres of the above character bonded together into a gas-tight slab with the fibres oriented in a regular array with their longitudinal axes extending from one major surface of the slab to the other, means for accelerating electrons emitted by the second photo-sensitive cathode layer so that they bombard the second phosphor layer, and means for focussing the said electrons into an image forming beam.

2. A tube as set forth in claim 1 wherein the fibers of at least one of said walls are tapered.

3. An electronic tube comprising a first wall of the tube in the form of a bundle of light guiding fibres bonded together into a gas-tight slab with the fibres oriented in a regular array with their longitudinal axes extending from the surface of the slab outside the tube to the surface of the slab within the tube, a photo-sensitive cathode layer deposited on the said surface of the slab which is within the tube, means for accelerating electrons emitted by the said photo-sensitive cathode layer so that they bombard a second wall of the tube, means for controlling the said electrons so that they provide an image-forming beam, the second wall of the tube being in the form of a bundle of very fine smooth side surfaced light-guiding fibres oriented in a regular array with their longitudinal axes extending from the surface of the second wall within the tube to the surface of the second wall outside the tube, the surface of the second wall within the tube being coated with a substance of a type which, when bombarded with electrons, emits radiation to which a photographic plate is sensitive.

4. A tube as claimed in claim 3 wherein the fibres of at least one of said walls are tapered.

5. A two-stage photo multiplier tube having a first wall, a second wall and an intermediate wall, each of such walls taking the form of a bundle of light-guiding fibres oriented in a regular array with the longitudinal axes of the fibres of all three walls extending in the direction of an axis of the tube intersecting the first wall, the intermediate wall and the second wall, the intermediate wall separating the tube into two independent gas-tight envelopes, a first photo-sensitive cathode layer deposited on the surface of the first wall which is nearest to the intermediate wall, a first phosphor layer deposited on the surface of the intermediate wall which is nearest to the first wall, means for accelerating electrons emitted by the first photo-sensitive cathode layer and for controlling such electrons so that they bombard the first phosphor layer as an image-forming beam, a second photo-sensitive cathode layer deposited on the surface of the intermediate wall remote from the first wall, a second phosphor layer deposited on the surface of the second wall which is nearest to the intermediate wall and means for accelerating electrons emitted by the second photo-sensitive cathode layer and for controlling such electrons so that they bombard the second phosphor layer as an image-forming beam, the surface of the second wall which is remote from the second phosphor layer and which is outside the tube being flat.

6. A tube as claimed in claim 5 wherein the fibres of at least one of said walls are tapered.

7. An electronic image-forming tube comprising a hollow body having a wall in the form of a gas-tight slab secured to said body in such a manner as to enclose an evacuated space within said body, the major area of said wall comprising a large number of very fine elongated smooth surfaced light-guiding fibres each formed of a transparent material of a predetermined refractive index surrounded by and maintained in closely spaced bonded relation to adjacent fibres by transparent material of a relatively lower refractive index so as to render said wall gas-tight and the interfaces between said fibres and said transparent material of lower refractive index highly internally reflective, the fibres forming said wall being positioned in side-by-side co-extensive relation to each other and being oriented so as to extend through the wall from one surface thereof to the other in the longitudinal direction of said hollow body and a layer of fluorescent material deposited upon the surface of said wall defining said evacuated space and in direct contact with the adjacent exposed ends of the fibres thereof.

8. A tube as set forth in claim 7 wherein the fibres are tapered.

9. An electronic image-forming tube comprising a hollow body having a bundle of very fine elongated light-guiding fibres having smooth side surfaces each formed of glass having high light transmission and a predetermined relatively high index of refraction surrounded by and maintained in closely spaced bonded relation to adjacent fibres by a glass having a predetermined relatively low index of refraction surrounding and spacing each of said fibres so as to bring about a relatively high total internal reflection at said smooth side surfaces, said bonded bundle of fibres being secured to said hollow body so as to have a gas-tight seal therewith and a gas-tight seal with each other and having their inner end surfaces shaped to form a continuous inner wall, said fibres being positioned in side-by-side co-extensive relation to each other and a layer of fluorescent material deposited upon said inner wall and in direct contact with the adjacent exposed ends of the fibres.

10. A tube as set forth in claim 9 wherein the fibres are tapered.

11. An electron-optical image amplifier comprising a hollow body, a first transversely extending wall and a second transversely extending wall secured to said body in such longitudinally spaced gas-tight relation to each other as to enclose an evacuated space within said body, the major area of one of said walls comprising a very large number of very fine elongated light-guiding fibres having smooth side surfaces, and each fibre being formed of a transparent material of a predetermined refractive index, and each fibre thereof being surrounded by a material of a predetermined lower refractive index, said fibres being secured in bonded relation to adjacent fibres so as to render said area of said one wall gastight, the interfaces between said transparent material of a predetermined refractive index and said surrounding material of lower refractive index being highly internally reflective, the fibres forming said area of said one wall being positioned in side-by-side relation to each other and being oriented so as to extend through said one wall from one face thereof to the other and disposed generally in the longitudinal direction of said body, a photosensitive cathode layer and a fluorescent layer within said evacuated space, one of said layers being disposed adjacent one of said walls and the other of said layers being disposed adjacent the other of said walls and in direct contact with the exposed ends of the light-guiding fibres thereof, and electronic means for accelerating and focusing electrons emitted by said photosensitive cathode layer, when energized by image-forming radiation directed onto said cathode layer, so as to impinge upon and form an image on said fluorescent layer, the fibres of said one wall serving as independent optical elements forming isolated paths for conducting light through said one wall.

12. An electron-optical image amplifier comprising a hollow body, a first transversely extending wall and a second transversely extending wall secured to said body in such longitudinally spaced gas-tight relation to each other as to enclose an evacuated space within said body, the major area of each of said walls comprising a very large number of very fine elongated light-guiding fibres having smooth side surfaces, and each fibre being formed of a transparent glass of a predetermined relatively high refractive index, and each fibre thereof being surrounded by and maintained in closely spaced bonded relation to adjacent fibres by a transparent glass of a predetermined relatively low refractive index so as to render said area of said wall gas-tight and the smooth side surfaces highly internally reflective, the fibres forming said areas of said walls being positioned in side-by-side relation to each other and being oriented so as to extend through said walls from one face thereof to the other generally in the longitudinal direction of said body, a photosensitive cathode layer deposited upon the interior surface of said first wall, a layer of fluorescent material deposited upon the interior surface of said second wall and in direct contact with the exposed ends of the light-guiding fibres thereof, and electronic means for accelerating and focusing electrons emitted by said photo-sensitive cathode layer, when energized by image-forming radiation directed onto said cathode layer, so as to impinge upon and form an image upon said fluorescent layer, the fibres of said second wall serving as independent optical elements forming isolated paths for conducting the light from said fluorescent layer through said second wall and to the opposite face thereof.

13. An electron-optical image amplifier as set forth in claim 12 wherein at least one of said walls embodies tapered fibres.

14. A multiple stage electron-optical image amplifier comprising elongated hollow tubular means, first transversely extending wall means, second transversely extending wall means and intermediate transversely extending wall means, said wall means being secured to said tubular means in such longitudinally spaced gastight relation relative to each other as to enclose first and second evacuated spaces therein, the major areas of said second wall means and of said intermediate wall means each comprising a very large number of very fine elongated light-guiding fibres, each fibre having smooth side surfaces and each formed of a transparent glass of a predetermined relatively high refractive index, and each fibre of each major area being surrounded by and maintained in closely spaced bonded relation to adjacent fibres by a transparent glass of a predetermined relatively low refractive index so as to render each of said major areas of said wall means gas-tight and the smooth side surfaces of the fibres highly internally reflective, the fibres forming each of said areas being positioned in side-by-side relation to each other and being oriented so as to extend through said wall means from one face thereof to the other in substantially parallel relation to the longitudinal direction of said tubular means, a photosensitive cathode layer deposited upon the interior surface of said first wall means and a layer of fluorescent material deposited upon the interior surface of said second wall means, a second layer of fluorescent material deposited upon the surface of said intermediate wall means which faces said first wall means and a second photosensitive cathode layer upon the face of said intermediate wall means facing said second wall means, electronic means for accelerating and focusing electrons emitted by said first photosensitive cathode layer, when energized by image-forming radiation directed thereon, so as to impinge upon and form an image on the layer of fluorescent material upon said intermediate wall means, and electronic means for accelerating and focusing electrons emitted by the second-mentioned photosensitive cathode layer, when energized by radiation traveling through the fibres of said intermediate wall means, so as to impinge upon and form an image on the layer of fluorescent material on said second wall means, the fibres of said second wall means serving as independent optical elements forming isolated paths for conducting the light from said second layer of fluorescent material through said second wall means and to the opposite face thereof.

15. A multiple stage electron-optical image amplifier as set forth in claim 14 wherein the fibres of at least one of said walls are tapered.

16. An electronic image-forming tube comprising a hollow body having a wall in the form of a gas-tight slab secured to said body in such a manner as to enclose an evacuated space within said body, the major area of said wall comprising a large number of very fine elongated smooth surfaced light-guiding fibres each formed of a transparent material of a predetermined refractive index surrounded by a relatively thin coating of material of a lower refractive index, said fibres being secured in bonded relation to adjacent fibres so as to render said wall gas-tight, the interfaces beween said transparent material of a predetermined refractive index and said surrounding material of lower refractive index being highly internally reflective, said fibres being oriented so as to extend through the wall from one surface thereof to the other, and a layer of fluorescent material deposited upon the surface of said wall defining said evacuated space and in direct contact with the adjacent exposed ends of the fibres thereof.

17. A tube as set forth in claim 16 wherein the fibres are tapered.

18. An electronic image-forming tube comprising a hollow body having a wall in the form of a gas-tight slab secured to said body in such a manner as to enclose an evacuated space within said body, the major area of said wall comprising a large number of very fine elongated smooth surfaced light-guiding fibres each formed of glass of a relatively high refractive index surrounded by a relatively thin coating of glass of a lower refractive index, said fibres being secured in bonded relation to adjacent fibres so as to render said wall gas-tight, the interfaces between said glass of relatively high refractive index and said glass of lower refractive index being highly internally reflective, said fibres being oriented so as to extend through the wall from one surface thereof to the other, and a layer of fluorescent material deposited upon the surface of said wall defining said evacuated space and in direct contact with the adjacent exposed ends of the fibres thereof.

19. A tube as set forth in claim 18 wherein the fibres are tapered.

20. A cathode ray tube screen comprising in combination: a phosphor layer which emits light upon activation thereof, and means for transmitting such light, such means comprising a multitude of parallel, side-by-side arrayed light transparent glass fibre units abutting endwise upon said phosphor layer, each of said fibre units comprising a light transparent glass fibre core which is circumferentially surrounded by a glass coating characterized by a lower index of refraction than that of said fibre core, each of said fibre units conveying light from one end to the other end thereof by the mechanism of internal reflection.

21. An electronic image-forming tube comprising a hollow body having a wall in the form of gas-tight slab secured to said body in such a manner as to enclose an evacutaed space within said body, the major area of said wall comprising a large number of very fine elongated smooth surfaced light-guiding fibres each formed of a transparent material of a predetermined refractive index surrounded by a relatively thin coating of material of a lower refractive index, said fibres being secured in bonded relation to adjacent fibres so as to render said wall gastight, the interferfaces between said transparent material of a predetermined refractive index and said surrounding material of lower refractive index being highly internally reflective, said fibres being oriented so as to extend through the wall from one surface thereof to the other, and a layer of fluorescent material deposited upon the surface of said wall defining said evacuated space and in direct contact with the adjacent exposed ends of the fibres thereof.

22. An electronic image-forming tube comprising a hollow body having a wall in the form of a gas-tight slab secured to said body in such manner as to enclose an evacuated space within said body, the major area of said wall comprising a large number of very fine elongated smooth surfaced light-guiding fibres each formed of glass of a relatively high refractive index surrounded by a relatively thin coating of glass of a lower refractive index, said fibres being secured in bonded relation to adjacent fibres so as to render said wall gas-tight, the interfaces between said glass of relatively high refractive index and said glass of lower refractive index being highly internally reflective, said fibres being oriented so as to extend through the wall from one surface thereof to the other, and a layer of fluorescent material deposited upon the surface of said wall defining said evacuated space and in direct contact with the adjacent exposed ends of the fibres thereof.

23. A cathode ray tube screen comprising in combination: a phosphor layer which emits light upon activation thereof, and means for transmitting such light, such means comprising a multitude of parallel, side-by-side arrayed light transparent fibre units abutting endwise upon said phosphor layer, each of said fibre units comprising a light transparent glass fibre core on the order of one to four thousandths of an inch in diameter which is circumferentially surrounded by glass characterized by a lower index of refraction than that of said fibre core, each of said fibre units conveying light from one end to the other end thereof by the mechanism of internal reflection.

24. A screen comprising phosphor means which emits light upon activation thereof, a thin, transparent glass member abutting one face of said phosphor means, and light-conveying glass fibre members each having a light-insulating glass coating and abutting endwise upon said transparent glass member, said transparent glass member being of a thickness such that there is minimal loss of definition in the light transmitted from said phosphor means to said fibre members.

25. A light-conducting device comprising a plurality of elongated light-conducting elements in side-by-side relation with each other, said elements each embodying a glass core part having a relatively high index of refraction and a glass cladding surrounding said glass core part and fused thereto, said cladding having a relatively low index of refraction, and a glass matrix having a melting temperature lower than that of said claddings in between and in surrounding fused relation with said elements.

26. A light-conducting device comprising a plurality of individually light-insulated fibre-like glass light-conducting elements in side-by-side relation with each other and a matrix of glass bonding together said elements, each of said light-conducting elements being circumferentially surrounded by glass of a lower index of refraction than that of said light-conducting elements.

27. A light-conducting device comprising a plurality of elongated light-conducting elements in spaced side-by-side relation with each other, said elements each embodying a glass core part having a relatively high index of refraction and a glass cladding surrounding and fused to said glass core part and having a relatively low index of refraction and a glass matrix having a lower melting temperature than that of said cladding between said elements and in fused relation therewith for permanently securing said elements together.

References Cited in the file of this patent

UNITED STATES PATENTS

| | | |
|---|---|---|
| 2,091,152 | Malpica | Aug. 24, 1937 |
| 2,122,750 | Nicolson | July 5, 1938 |
| 2,354,591 | Goldsmith | July 25, 1944 |
| 2,510,106 | Henroteau | June 6, 1950 |
| 2,640,162 | Espenschied et al. | May 26, 1953 |
| 2,825,260 | O'Brien | Mar. 4, 1958 |

OTHER REFERENCES

Nature, No. 4392, Jan. 2, 1954, pages 39–41.

UNITED STATES PATENT OFFICE
CERTIFICATE OF CORRECTION

Patent No. 3,141,105           Dated    July 14, 1964

Inventor(s)    Jeofry Stuart Courtney-Pratt

It is certified that error appears in the above-identified patent and that said Letters Patent are hereby corrected as shown below:

Column 13, line 1, after "fibres" insert -- of a predetermined index of refraction bonded together by a material of a lower index of refraction in surrounding relation with said fibres, said fibres being --.

Signed and sealed this 6th day of February 1973.

(SEAL)
Attest:

EDWARD M. FLETCHER, JR.
Attesting Officer

ROBERT GOTTSCHALK
Commissioner of Patents